H. H. SWEETLAND.

Improvement in Plows.

No. 130,882.　　　　　　　　　　　Patented Aug. 27, 1872.

Witnesses.　　　　　　　　　Inventor:
How. S. Abbot.　　　　　　　Henry H Sweetland
Alex S. Davidson.　　　　　　By M. W. Leggett
　　　　　　　　　　　　　　　Attorney

UNITED STATES PATENT OFFICE.

HENRY H. SWEETLAND, OF CENTRETON, OHIO.

IMPROVEMENT IN PLOWS.

Specification forming part of Letters Patent No. 130,882, dated August 27, 1872.

*To all whom it may concern:*

Be it known that I, HENRY H. SWEETLAND, of Centreton, Huron county, State of Ohio, have invented certain new and useful Improvements in Sulky-Plows, of which the following is a specification:

The nature of my invention consists in a mounted reversible plow, which can be made to throw a furrow in either direction, by simply operating a lever placed in reach of the driver, as will be hereafter more fully set forth.

Figure 1:
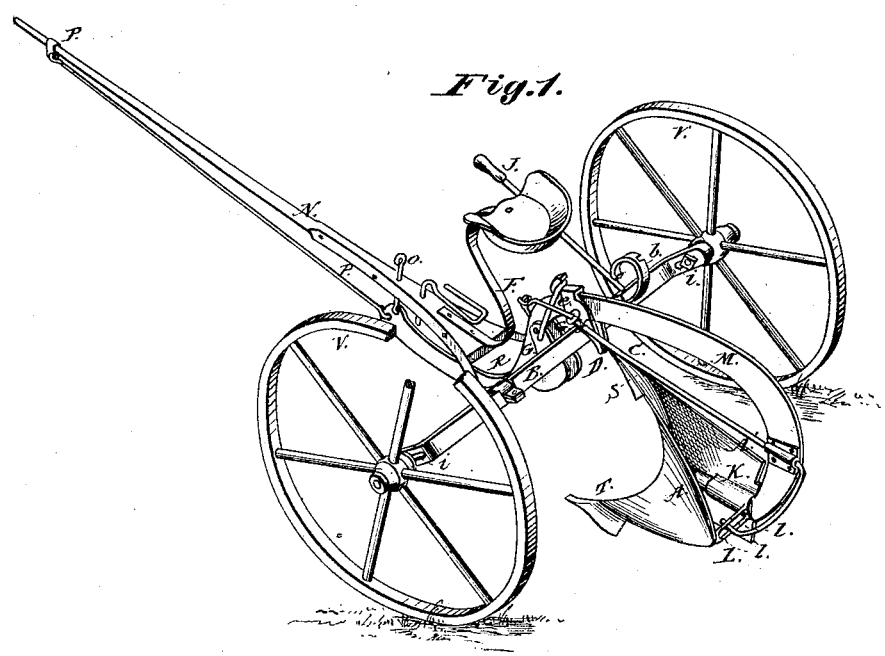
Figure 2:
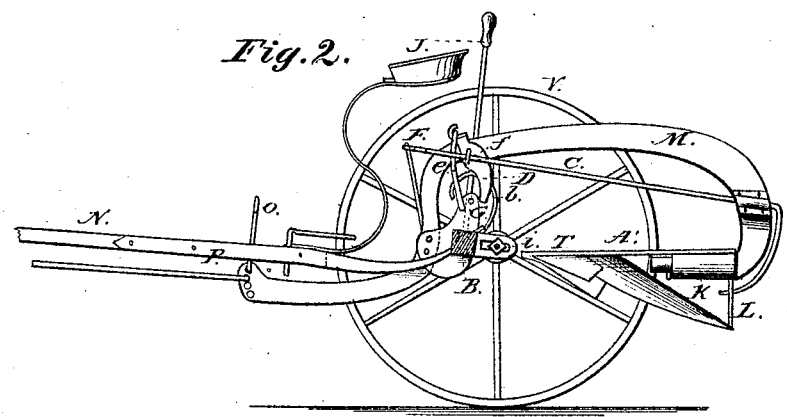

In the drawing, Figure 1 represents a perspective of my invention. Fig. 2 represents a sectional side view.

B represents the axle, having its ends bent at right angles thereto in different directions, and provided with the slots $i$ for the purpose of regulating the wheels V. These wheels are of the same size, and as the axle is turned partly around by means of the lever J turning one of the bent ends up and the other down, one of them will be raised and the other lowered, so that either wheel may be made to run in the furrow without affecting the horizontal position of the axle. M is the plow-beam, which is so shaped as to extend up over the axle and down under the tongue, where it is secured to the sliding rod $o$. This rod passes up through the tongue, and is used to raise and lower the end of the beam, so as to make the plow cut a deep or shallow furrow, as may be desired. Secured to the end of the beam is a draft-rod, P, which extends forward and is fastened to the front end of the tongue N. Attached to the axles are two disks, G, one of which has a connecting-rod, F, secured to it which extends upward and is jointed to the curved reversing-rod C. This rod C is held in position by means of eyes $f$, or similar fastenings, to side of the beam, and has its rear end curved so as to be held in the slot L formed by the guides or rods $l$. The rear end of the beam forms a pivot, K, upon which the reversible plow A, having two mold-boards, S T, is made to partially revolve. These two mold-boards are formed from a curved sheet of any suitable metal, and have a land-side, A', made of a flat sheet, secured to them in such a manner as to form two complete plows, each of which throws a furrow in opposite directions.

To the top of each of the disks G there is secured a bent rod, $e$, which is fastened to an arm of the lock D in such a manner as to vibrate the lock back and forth to catch or loosen the ends of the plows.

The operation of my plow is as follows: When the lever J is in an upright position, held in a notch in the catch $b$, the axle will be perfectly level and the double plow will be held raised above the ground, the mold-boards downward and the land-side upon a plane with the axle. In this position the plow is ready to be driven from place to place, or to ride over obstructions which may be in the line of its progress. As soon as it is desired to use the plow the lever is moved either forward or back, and one of the mold-boards is at once brought into play. If it is moved forward the right wheel is lowered and the left one is raised, and the disks, operating upon the connecting-rod F and reversing-rod C, turn the plow, so that a left-hand furrow is cut. The disks operating at the same time upon the lock D, just as the share of the mold-board S comes into position, move forward so as to catch it, and thus hold it firmly in position and prevent it from turning.

By removing the lever backward the above operation is reversed, and the plow will cut a right-hand furrow.

Having thus described my invention, what I claim as new, and desire to secure by Letters Patent, is—

1. The combination of the reversible plow A, beam M, and the operating mechanism, substantially as described.

2. The beam B, disks G, lock D, and lever J, when combined to form a lock for holding the plows in position, substantially as set forth.

3. The beam M extending forward over the axles and under the tongue, in combination with the draft-rod P and adjusting-rod $o$, substantially as specified.

4. The axles B, lever J, disks G, beam M, lock D, and reversible plow A, when all are combined as set forth.

H. H. SWEETLAND.

Witnesses:
J. B. MEREDITH,
J. G. HILL.